US011533233B2

(12) United States Patent
Schmidt et al.

(10) Patent No.: US 11,533,233 B2
(45) Date of Patent: Dec. 20, 2022

(54) TECHNIQUES FOR SELECTING SPANNING TREE AMONG CANDIDATE LINKS WITHIN AN AD HOC NETWORK

(71) Applicant: Apple Inc., Cupertino, CA (US)

(72) Inventors: Johannes P. Schmidt, Cupertino, CA (US); Kevin Shen, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/032,081

(22) Filed: Sep. 25, 2020

(65) Prior Publication Data

US 2021/0099350 A1 Apr. 1, 2021

Related U.S. Application Data

(60) Provisional application No. 62/907,164, filed on Sep. 27, 2019.

(51) Int. Cl.
*H04L 41/0893* (2022.01)
*H04L 45/02* (2022.01)
*H04L 45/48* (2022.01)
*H04L 41/12* (2022.01)

(52) U.S. Cl.
CPC .......... *H04L 41/0893* (2013.01); *H04L 41/12* (2013.01); *H04L 45/02* (2013.01); *H04L 45/48* (2013.01)

(58) Field of Classification Search
CPC ..... H04L 41/0893; H04L 45/02; H04L 41/12; H04L 45/48
See application file for complete search history.

(56) References Cited

U.S. PATENT DOCUMENTS

| 8,234,395 | B2 * | 7/2012 | Millington | G06F 3/165 709/231 |
| 8,310,957 | B1 * | 11/2012 | Rekhter | H04L 45/48 370/256 |
| 2005/0073963 | A1 * | 4/2005 | Goodfellow | H04L 49/65 370/255 |
| 2005/0249185 | A1 * | 11/2005 | Poor | H04L 45/12 370/349 |
| 2007/0038999 | A1 * | 2/2007 | Millington | H04L 65/60 718/100 |
| 2008/0168182 | A1 * | 7/2008 | Frank | G06F 1/14 709/248 |
| 2010/0211604 | A1 * | 8/2010 | Campbell | H04M 3/42374 707/780 |

(Continued)

*Primary Examiner* — Tonia L Dollinger
*Assistant Examiner* — Joseph M Cousins
(74) *Attorney, Agent, or Firm* — BakerHostetler

(57) ABSTRACT

Techniques are disclosed for developing spanning trees at devices that are interconnected in a rendering network. According to the techniques, a change in connectivity between two devices in the rendering network may be detected at a first one of the devices, information representing a cost of connectivity may be stored in a data record at the first device. A spanning tree may then be calculated from a candidate set of communication links that interconnect the devices of the rendering network according to cost information representing those communication links. A device may exchange information, such as information regarding the rendering network, to another device of the rendering network according to communication links identified for the spanning tree. The data record may be of a conflict-free replicated data type.

38 Claims, 5 Drawing Sheets

(56) References Cited

U.S. PATENT DOCUMENTS

| | | | |
|---|---|---|---|
| 2010/0284330 A1* | 11/2010 | Huang | H04L 45/28 |
| | | | 370/328 |
| 2014/0003295 A1* | 1/2014 | Gossain | H04L 45/48 |
| | | | 370/256 |
| 2014/0093085 A1* | 4/2014 | Jarvis | H04R 29/007 |
| | | | 381/17 |
| 2015/0200803 A1* | 7/2015 | Kashyap | H04L 41/0668 |
| | | | 370/217 |
| 2015/0365285 A1* | 12/2015 | Phillips | H04W 76/20 |
| | | | 370/254 |
| 2017/0024451 A1* | 1/2017 | Sullivan | G06F 16/273 |
| 2017/0192739 A1* | 7/2017 | Gossain | G06F 3/165 |
| 2019/0097886 A1* | 3/2019 | DAmato | H04L 41/0893 |
| 2019/0116117 A1* | 4/2019 | De Graaff | H04L 47/783 |
| 2020/0053148 A1* | 2/2020 | Motylinski | H04L 45/021 |
| 2020/0259746 A1* | 8/2020 | Thubert | H04L 41/16 |

* cited by examiner

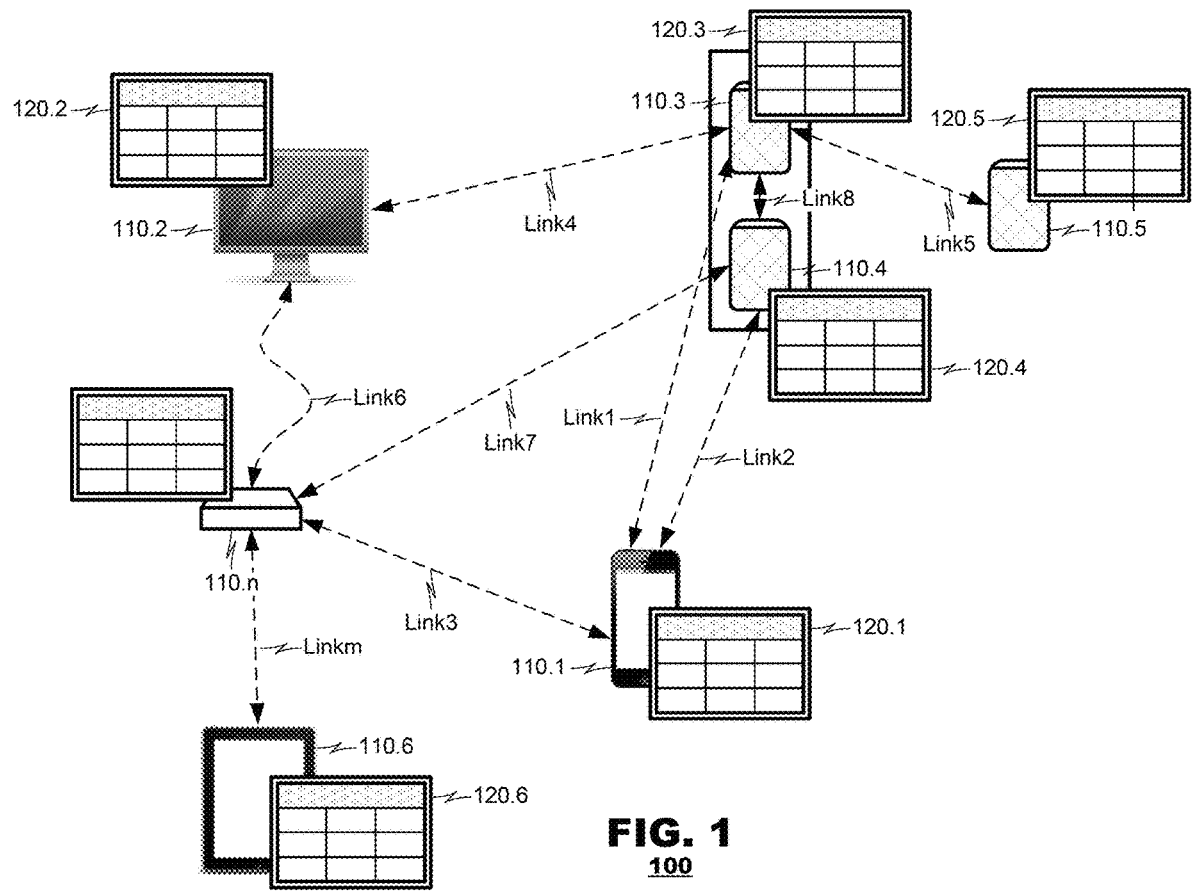

300

400

500

600

700

800

900

TECHNIQUES FOR SELECTING SPANNING TREE AMONG CANDIDATE LINKS WITHIN AN AD HOC NETWORK

CROSS REFERENCE TO RELATED APPLICATION

This application claims the benefit of U.S. Provisional. Application No. 62/907,164 filed on Sep. 27, 2019, the disclosure of which is incorporated by reference herein.

BACKGROUND

Aspects of the present disclosure relates to coordination of multiple independently-operating devices within an ad hoc rendering network. More particularly, they relate to techniques for developing spanning trees within a rendering network, where devices may develop connectivity with other devices, lose connectivity with other devices, and/or have characteristics of connectivity with other device change dynamically during an instance of the rendering network.

Many modern consumer electronic devices have been developed to render data to devices' users in a variety of formats. Taking audio/visual data as an example, it is common to render video information via large flat screen displays, laptop and tablet computers, and hand-held smartphones. Similarly, it is common to render audio information via such devices, and also via smart speakers, Bluetooth speakers, and the like. The media rendering capabilities vary from device to device. Similarly, the level of "intelligence" may vary from device to device (some so-called smart speakers may have the capability to download audio data for rendering on its own whereas other "dumb" speakers must have audio data pushed to them). Oftentimes, individual rendering devices may operate independently of other devices without a centralized command and control capability, a situation which may create complexities when attempting to render data by such devices in a coordinated fashion.

Additional complexities may arise in routing data across devices in a rendering network. Devices may be linked to other devices in an ad hoc fashion, where communication links between devices may be created, changed, and/or lost without a warning. Typically, it will be uncommon that every device in a rendering network has a direct communication link to every other device in that network. It is more common that a single device will communicate directly with a sub-set of other devices in the rendering network. As communication links are added, lost and/or changed, it become a complex undertaking to determine which communication links should be used to route communications among the members of the rendering network. An inefficient use of the communication links can cause excessive amount of communication messaging among devices in the network or inefficient use of communication resources.

BRIEF DESCRIPTION OF THE DRAWINGS

FIG. 1 is a block diagram of an exemplary network system in which aspects of the present disclosure find application.

FIG. 2 illustrates an exemplary data record according to an aspect of the present disclosure.

DETAILED DESCRIPTION

Figure 3:
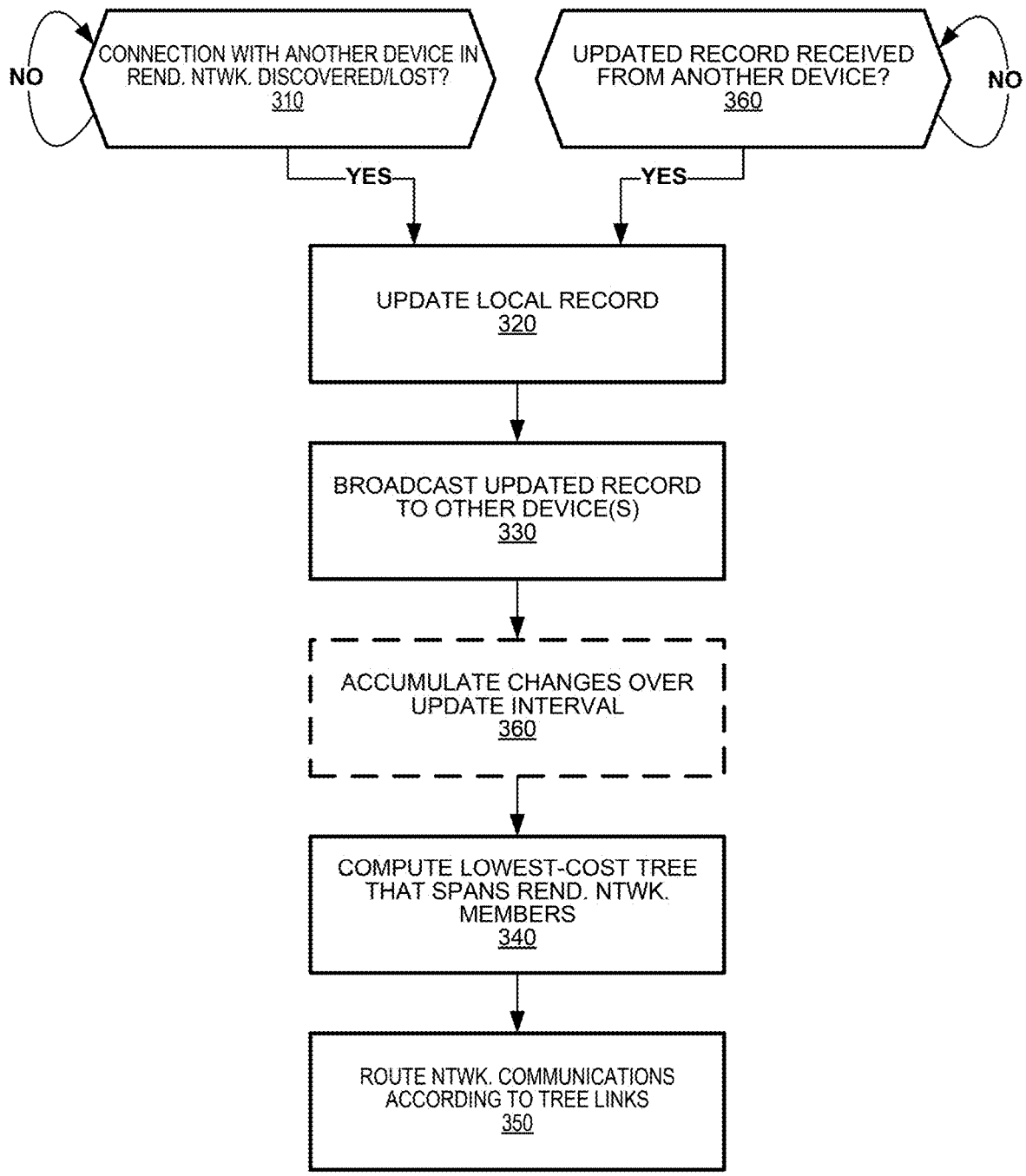
FIG. 3 illustrates a method according to an aspect of the present disclosure.

Aspects of the present disclosure provide techniques for developing spanning trees in a rendering network. According to these techniques, a change in connectivity may be detected between two devices in a rendering network and an information representing a cost of connectivity may be stored in a data record at a first one of the devices. A spanning tree may be calculated from a candidate set of communication links that interconnect devices of the rendering network according to cost information representing those communication links. A device may exchange information, such as information regarding the rendering network, to another device of the rendering network according to communication links identified for the spanning tree. The data record may be of a conflict-free replicated data type ("CRDT").

FIG. 1 is a block diagram of an exemplary network system 100 in which aspects of the present disclosure find application. FIG. 1 illustrates a set of devices 110.1, 110.2, . . . , 110.$n$ that are members of a common rendering network 100. Thus, the rendering network 100 may be composed of devices 110.1-110.$n$ that are grouped together dynamically for rendering media data. Typically, each device 110.1-110.$n$ may communicate only with a sub-set of other devices in the system; it may be rare event that all devices 110.1-110.$n$ communicate with all other devices 110.1-110.$n$. The devices 110.1-110.$n$ may communicate with each other via communication links (exemplary Links 1-8 are shown), which may be provided by different types of communication technologies, involving different data rates, different qualities of service, and different error characteristics. Moreover, the manner and type of connectivity between individual devices 110.1-110.$n$ may vary over time. For example, a pair of devices (e.g., 110.1 and 110.2) may be in communication at one time but lose connectivity at another time. Similarly, a given pair of devices (e.g., devices 110.1 and 110.3) may possess connectivity by a first communication technology (e.g., Bluetooth) at one moment and may be connected by a second communication technology (WiFi) at another. Moreover, individual devices may join and/or disconnect from time to time as connectivity between devices fluctuates.

The principles of the present disclosure may find application with a variety of media playback and control devices, including audio speakers 110.3, 110.4, 110.5, video displays 110.2, media console devices 110.$n$ (such as set top boxes or Apple TV devices), smartphones 110.1, and/or personal or tablet computers 110.6 that communicate with each other over the communication links (Links 1-8). The principles of the present disclosure may also find application with other types of media playback and control devices, such as dedicated video conferencing equipments, server computers, personal computers, or video game consoles. The types of device, the types of media that they exchange, and the manner of connectivity between them are immaterial to the present disclosure unless discussed hereinbelow.

In an aspect, the devices 110.1, 110.2, ..., 110.n in a common network 100 may exchange data records 120.1, 120.2, ..., 120.n, each data record exchanged by a device identifies links that are known to the device to be established between devices in the network. Accordingly, each device 110.1-110.n may store a local copy of its respective data record 120.1-120.n. As an individual device (e.g., 110.1) detects: that a new connectivity link with another device (e.g., 110.2) has been created, that a link has been lost, and/or that a change to the character of a link has been occurred, the device 110.1 may update its local copy 120.1 of the data record. Then, the device 110.1 may communicate the change to its local data record 120.1 to the other device(s) with which it has connectivity. The other devices may relay the changed state of the data record to other devices in the network 100 until all devices 110.1-110.n have updated their data record 120.1-120.n. Over time, given sufficient network connectivity, each device's copy of the data record will converge into an identical version.

In an aspect, the data records 120.1, 120.2, ..., 120.n may be designed according to CRDT principles, which permits copies of the data records 120.1-120.n to be updated independently and concurrently without coordination among copies, and where it is mathematically possible to resolve inconsistencies which might result. The data records 120.1-120.n may record the time in which operations reflected in the data records occur, such recorded timestamps may permit receiving devices to resolve possible conflicts among update operations.

FIG. 2 illustrates an exemplary data record 200 according to an aspect of the present disclosure. The data record 200 may possess entries 210.1-210.m representing known information about the state of communication links (Links 1-m) among known devices (nodes) of the rendering network 100 (FIG. 1). Each entry (e.g., entry 210.1) may contain information identifying: the devices that are connected via the respective link, shown as nodes in fields 220, 230; the type of connection that the link provides, field 240, a "cost" of the link, field 250, and a timestamp 260 representing a time at which the entry was most recently updated. The example of FIG. 2 illustrates entries 210.1-210.m only for the active links shown in FIG. 1 and only for currently-available information. In practice, the data record 200 also may possess entries (not shown) representing links that previously were detected but were lost and other entries (also not shown) representing prior state of the links that are currently active. Lost links may be represented by a valid/invalid flag (not shown) or by setting a cost value to a special value (such as −1) that signifies the link is unavailable. Although permissible, a data record 200 need not contain entries for all communication links throughout the entire history of the rendering network 100 (FIG. 1); the devices may employ a removal scheme to delete obsolete entries after passage of time indicates they are no longer relevant to maintenance of the rendering network 100.

The cost field 250 may represent a performance characteristic of a given link relative to a common performance benchmark. Individual communication Links1-m (FIG. 1) may provide associated communication bitrate capabilities and quality of service capabilities owing to their communication technologies. They may have associated error characteristics (e.g., signal strength, or bit error rates.) owing to ambient operating characteristics such as interference sources and shielding structures in the environment in which the devices operate. Each device may estimate the characteristics of its link and derive a cost value representing the performance of the link as compared to a benchmark. The devices thereafter may compare the costs of links against costs of other links to derive a spanning tree to be used for communication, as discussed below.

FIG. 3 illustrates a method 300 according to an aspect of the present disclosure. The method 300 may be performed in parallel and independently by each device in a rendering network 100 (FIG. 1). Operation of the method 300 may be triggered by a determination that a new connection with another device in the rendering network has been discovered and/or by a determination that an existed connection has been lost (box 310). In this event, the method 300 may update its local record reflecting the new state of the connection (box 320). The method 300 may broadcast the updated record to other device(s) with which it communicates (box 330). The method 300 may compute a lowest-cost tree that spans members of the rendering network (box 340). Thereafter, the method 300 may route new network communications according to the computed tree links (box 350).

Operation of the method 300 may also be triggered when a device receives an updated data record from another device in the rendering network (box 360). In this event, the method 300 may update its local record to match the received data record (box 320). The method 300 may broadcast the updated record to other device(s) with which it communicates (box 330). The method 300 may compute a lowest-cost tree that spans members of the rendering network. (box 340). Thereafter, the method 300 may route new network communications according to the computed tree links (box 350).

The spanning tree may be calculated from a matrix of costs associated with communication links of the rendering network, as may be recorded in the data record of a device. Thus, computation of a tree may involve deriving a set of communication paths from among available communication links that may result in the lowest overall cost of communicating information among the devices 110.1, 110.2, ..., 110.n (FIG. 1) in a rendering network. Oftentimes, candidate communication links between devices provide several alternative paths to route information between two device members of a rendering network. In the example of FIG. 1, for example, devices 110.1 and 110.2 are indirectly connected by a first set of communication links (Link 1 and Link 4) and by a second set of communication links (Link 3 and Link 6). A spanning tree need not employ all communication links to ensure delivery of information to all devices within a rendering network 100. The method 300 may compute a low-cost set of communication links that connect all devices in a rendering network to provide efficient delivery of information within the network 100.

Although permissible, the performance of boxes 340 and 350 may be timed to accommodate latencies involved in propagating new data record updates among members of a rendering network 100. For example, when operating in an environment that takes one second to propagate updates throughout a network, operation of boxes 340 and 350 may be performed using network state indicated by data record entries one second in the past (making an exception for scenarios in which communication links are lost; they may invoke boxes 340 and 350 immediately). In such an aspect, the method 300 may accumulate changes to the data record over an update interval 360 and thereafter may perform operations of boxes 340 and 350 using the changes accumulated in that interval. The update intervals of devices 110.1, 110.2, ..., 110.n (FIG. 1) in the rendering network 100 may be aligned to each other, which promotes use of common spanning trees throughout the network 100. In this manner, the method 300 may permit data record updates to propagate throughout a rendering network before devices re-evaluate their spanning trees.

Figure 4:
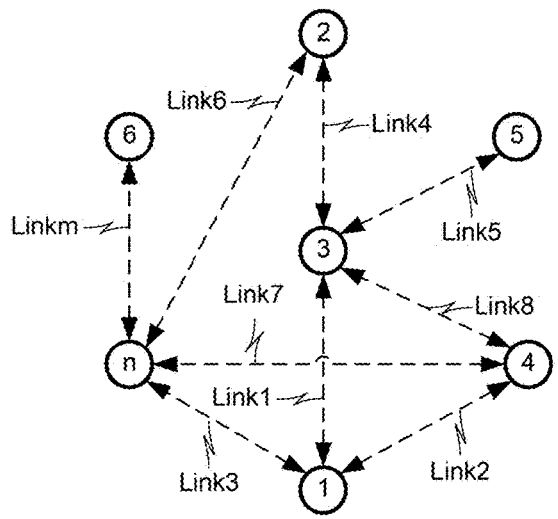
FIGS. 4-6 are node diagrams representing communication links and spanning trees derived from an exemplary rendering network.
Figure 5:
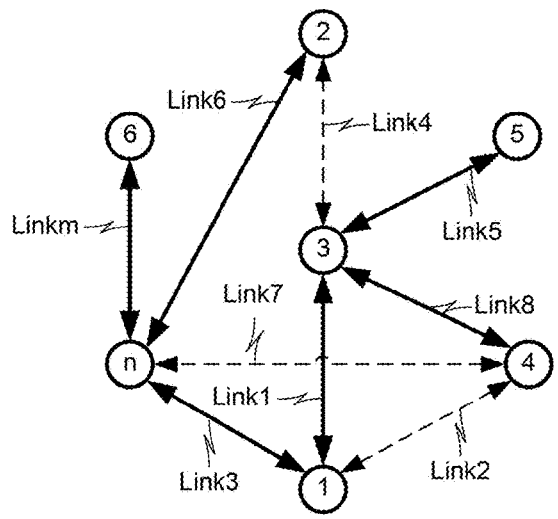
Figure 6:
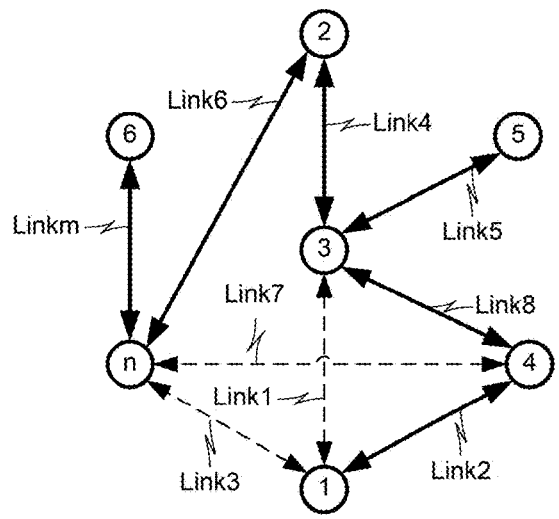

FIGS. 4-6 are node diagrams representing communication links and spanning trees derived from the exemplary rendering network 100 of FIG. 1. FIG. 4 represents the devices 110.1, 110.2, ..., 110.n of the rendering network 100 as respective nodes 1-n and the communication links 1-m between them. FIG. 5 illustrates a first spanning tree 500, represented by solid lines, that may be developed from the candidate set of communication links 1-m illustrated in FIG. 4. In this example, links 1, 3, 5, 6, 8 and m are selected, which connect each of the devices 110.1, 110.2, ..., 110.n in the rendering network 100 (nodes 1-n). FIG. 6 illustrates a second spanning tree 600, which utilizes links 2, 4, 5, 6, 8 and m, which connect the devices 110.1, 110.2, ..., 110.n in the rendering network 100. As discussed, different configurations of scanning trees may be selected based on: the different relative costs of the communication links, the discovery of new communication links among devices which affect the cost calculations, and the loss of communication links.

In an aspect, the method 300 may use the spanning trees themselves as the communication pathways through which the devices communication data record updates. Thus, a communication device that receives a data record update from another device may communicate the updated data record on to further devices using the communication links assigned to it by a current spanning tree. Using the examples of FIGS. 5 and 6, when a device at node 3 receives an updated data record over link 8 from a device at node 4, it may communicate the updated data record to nodes 1 and 5 when the spanning tree 500 is configured as shown in FIG. 5 but it may communicate the updated data record to nodes 2 and 5 when the spanning tree 600 is configured as shown in FIG. 6. In another aspect, when a data record updates a spanning tree derivation (for example, new information causes the spanning tree to change from the configuration of FIG. 5 to the configuration of FIG. 6), devices may merge the trees for the purposes of communicating updated data records. In this aspect, a device at node 3 that receives an update from node 4 may communicate the updated data record to nodes 1, 2, and 5.

Figure 7:
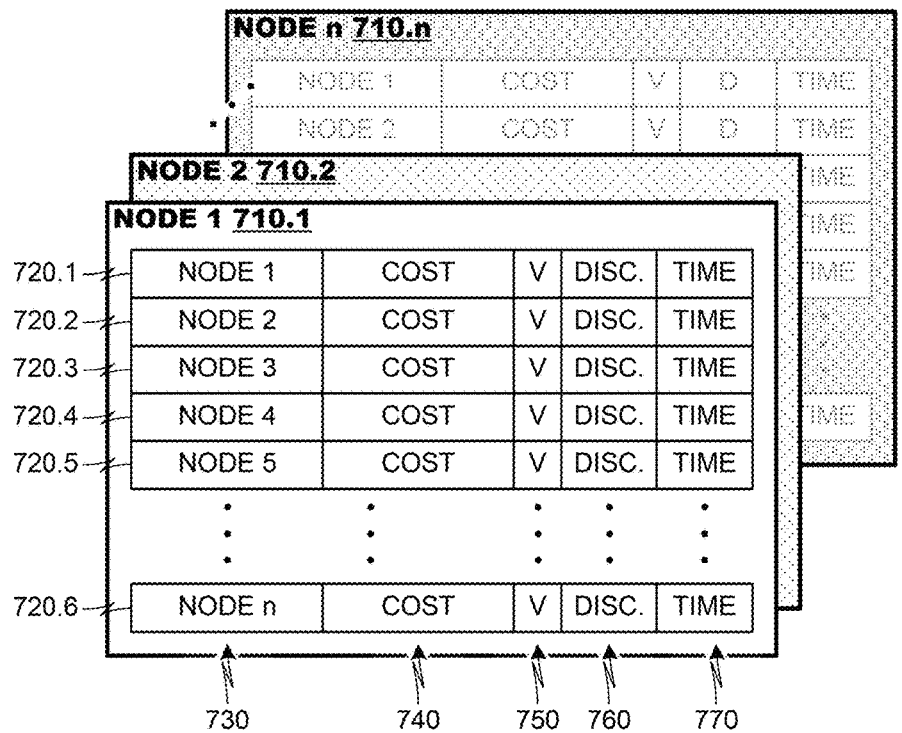
FIG. 7 illustrates a data record according to another aspect of the present disclosure.

FIG. 7 illustrates a data record 700 according to another aspect of the present disclosure. In this aspect, the data record 700 may contain entries 710.1, 710.2, ..., 720.n for each device 110.1, 110.2., ..., 110.n (FIG. 1) in a rendering network 100; each entry indicating, for the other devices, whether the device sees the other devices via a communication link. Consider the entry 710.1 for a first device 110.1 (labeled as a "Node 1"). The entry 710.1 may have subentries 720.1-720.6 corresponding to the devices 110.1-110.n of the rendering network. For each sub-entry 720.1-720.6, the data record 700 may store data including: a node field 730, identifying the other device connected by a respective link, a cost field 740, identifying a cost of a connection between the devices, a valid bit field 750, indicating whether the connection is most-recently detected as available, a discovery field 760, identifying a time at which a connection with the other device was discovered, and a time field 770 representing a time of the last update. When multiple communication links are detected between a pair of devices, a device's entry 710.1 may store multiple sub-entries for the other node (not shown), one for each communication link between the two nodes.

The discovery field 760 may contain null data initially and may be updated to reflect a network time when a communication link between a pair of devices is first detected. Thus, the presence of non-null data in the discovered field 760 may indicate that a communication link between the two devices was valid at one time.

The valid bit field 750 may be set and reset over the course of tithe as devices attempt to communicate with each other. A detection that communication between two devices is lost may cause the valid bit to be cleared. A state of the valid bit 750 may be considered invalid unless non-null data is present in the discovery field 760.

The method 300 of FIG. 3 finds application with the data record illustrated in FIG. 7. During operation, as connections between devices are detected as discovered or as lost (box 310), corresponding fields 750, 760, 770 may be amended within the data record 700. Discovery of a new connection between devices may cause a discovery field 760 to be set from null data, it may cause a valid bit field 750 to be set, and it may cause a time field 770 to be set identifying a network time at which the data record was altered. A determination that a connection between devices is lost may cause a valid bit field 750 to be cleared and the time field 770 to be set identifying the network time at which loss of connectivity was determined. A determination that a formerly lost connection has been restored may cause the valid bit field 750 to be set again, indicating that the connection has been rediscovered.

As in prior aspects, devices may estimate costs of the communication links and may update a cost field 740 accordingly. Cost estimates of connections that are not valid may be considered invalid.

Figure 8:
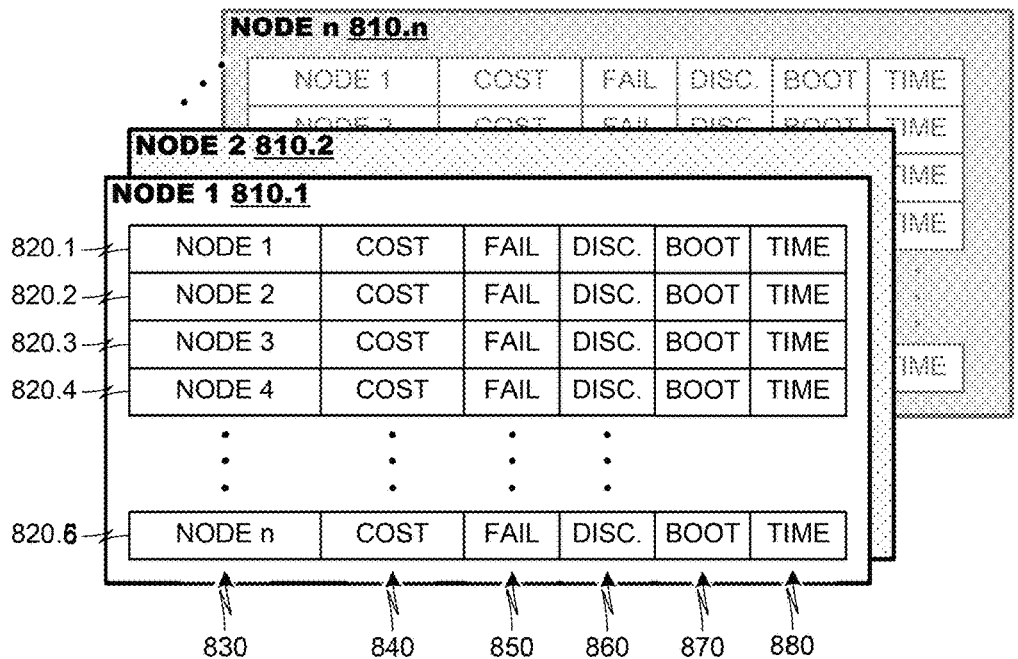
FIG. 8 illustrates a data record according to a further aspect of the present disclosure.

FIG. 8 illustrates a data record 800 according to another aspect of the present disclosure. In this aspect, the data record 800 may contain entries 810.1, 810.2, ..., 810.n for each device 110.1, 110.2., ..., 110.n (FIG. 1) in a rendering network 100; each entry indicating, with respect to the other devices, whether the device sees the other devices via a communication link. Consider the entry 810.1 for a first device 110.1 (labeled as a "Node 1"). The entry 810 may have sub-entries 820.1-820.6 corresponding to the devices 110.1-110.n of the rendering network. For each sub-entry 820.1-820.6, the data record 800 may store data including: a node field 830, identifying the other device connected by a respective link, a cost field 840, identifying a cost of a connection between the devices, a fail field 850, representing a time at which a linking attempt between the devices was identified as failed, a discovery field 860, identifying a time at which a connection with the other device was discovered, a boot field 870, identifying a time at which the device came online, and a time field 880, representing a time of the last update.

The fail field 850 may represent a time that a device attempted to communicate via a respective link and failed, either because an attempted connection failed or because an operational connection was lost. Devices 110.1, 110.2., ..., 110.n may employ merge rules to data record updates that take the highest-valued failing time of a fail field 850 for each connection that is tracked by the data record.

The discovery field 860 may be updated to reflect a network time when a communication link between a pair of devices is first detected or detected to be resumed. Devices 110.1, 110.2., ..., 110.n may employ merge rules to data record updates that take the highest-valued discovery time of a discovery field 860 for each connection that is tracked by the data record.

The boot field 870 may represent a time that a respective device 110.1 comes online. As devices go on-line and off-line, the booting time of a boot field 870 may be updated.

Devices 110.1, 110.2., ..., 110.*n* may employ merge rules to data record updates that take the highest-valued booting time of a boot field 870 for each connection that is tracked by the data record.

The method 300 of FIG. 3 finds application with the data record illustrated in FIG. 8. During operation, as connections between devices are detected as discovered or as lost (box 310), corresponding fields 850, 860, 870, 880 (and, as needed, field 830) may be amended within the data record 800. Discovery of a new connection between devices may cause a new entry to be entered within a node's entry 810.1 and appropriate values to be entered in fields 830-880. A determination that a connection between devices is lost may cause a failing time of a fail field 850 to be updated and the time field 880 to be set identifying the network time at which loss of connectivity was determined. A determination that a formerly lost connection has been restored may cause the discovery field 860 to be updated and the time field 880 to be set, indicating that the connection has been rediscovered.

A given connection may be taken as valid if the booting time value in the boot field 870 of the nodes are greater than the connection's failing time value in the fail field 850 or if the connections' discovery time value in the discovery field 860 is greater than its failing time value in the fail field 850 plus a timeout factor.

As in prior aspects, devices may estimate costs of the communication links and may update a cost field 840 accordingly. Cost estimates of connections that are not valid may be considered invalid.

The foregoing techniques describe techniques to discover connectivity between devices 110.1, 110.2, ..., 110.*n* within a rendering network 100 (FIG. 1) and to define spanning trees among candidate communication links that will carry data for the rendering network. As discussed, the rendering network may perform synchronized operations at independently-operating rendering devices to render media in a coordinated fashion. The spanning tree may carry signaling data that identifies media items to be rendered and timing of such rendering. The rendering devices also may exchange the media data to be rendered. In other aspects, one or more of the rendering devices 110.1-110.*n* may retrieve media items from other communication devices such as cloud-based media servers.

Figure 9:
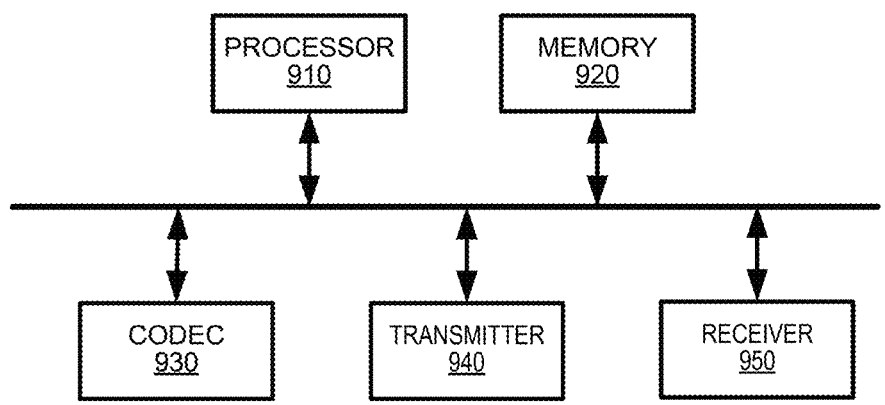
FIG. 9 is a simplified block diagram of a processing system according to aspects of the present disclosure.

FIG. 9 is a simplified block diagram of a processing system 900 within a device of the rendering network 110.1, 110.2, ..., 110.*n*. As illustrated in FIG. 9, the processing system 900 may include a processor 910, a memory system 920, a codec 930, a transmitter 940, and a receiver 950 in mutual communication. The memory system 920 may store program instructions that define the operation of methods as discussed herein in reference to FIGS. 1-8, which may be executed by the processor 910. Updated local data records 320 may be broadcasted 330 to devices in the rendering network via the transmitter 940 and may be received by devices 360 via the receiver 950. The devices 110.1-110.*n* may transmit and/or receive media data to be rendered, thus, media items may be encoded and decoded by the codec 930, received by the receiver 950, and/or transmitted by the transmitter 940.

Thus, the methods discussed herein may be embodied as programming instructions that are executed by processing systems 900 within the devices 110.1, 110.2, ..., 110.*n*. Typically, the devices may include one or more microprocessors 910 that retrieve program instructions from a memory 920 within the devices. The memory 920 may include electrical-based, optical-based, and/or magnetic-based memory devices. Similarly, the devices may store the data records discussed herein in such memory devices.

Implementations of the processing system 900 may vary. For example, the codec 930 may be provided as a hardware component within the processing system 900 separate from the processor 910 or it may be provided as an application program executed by the processor 910 of the processing system 900. The principles of the present invention find application with either embodiment.

The foregoing discussion has described operations of aspects of the present disclosure in the context of video systems (devices 110.1, 110.2, ..., 110.*n*) and network channels (Links 1-m). Commonly, these components are provided as electronic devices. Video systems and network channels can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs are typically stored in physical storage media such as electronic-based, magnetic-based storage devices, and/or optically-based storage devices, where they are read into a processor and executed. Decoders are commonly packaged in consumer electronic devices, such as smartphones, tablet computers, gaming systems, DVD players, portable media players, and the like. They can also be packaged in consumer software applications such as video games, media players, media editors, and the like. And, of course, these components may be provided as hybrid systems with distributed functionality across dedicated hardware components and programmed general-purpose processors, as desired.

Video systems of devices, including encoders and decoders, may exchange video through channels in a variety of ways. They may communicate with each other via communication and/or computer networks as illustrated in FIG. 1. In still other applications, video systems may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method, comprising:
   over an update interval, accumulating one or more network changes at a first device in a rendering network by, upon a change in connectivity between two devices in the rendering network, storing information representing a cost of connectivity in a data record at a first one of the devices,
   in response to an end of the update interval in which the one or more network changes were accumulated, calculating, at the first device, a spanning tree from a candidate set of communication links that interconnect devices of the rendering network according to cost information in the data record, and
   exchanging information from the first device to another device of the rendering network according to the spanning tree.

2. The method of claim 1, wherein the exchanged information includes the cost connectivity.

3. The method of claim 1, wherein the spanning tree carries signaling data that identifies media items to be rendered and timing of such rendering.

4. The method of claim 1, wherein the exchanged information is media data to be rendered.

5. The method of claim 1, wherein the data record is of a conflict-free replicated datatype and the method further comprises:
resolving an inconsistency amongst the one or more network changes.

6. The method of claim 1, wherein the change in connectivity occurs in response to a detection that a communication link between the two devices is new.

7. The method of claim 1, wherein the change in connectivity occurs in response to a detection that a communication link between the two devices is lost.

8. The method of claim 1, wherein the change in connectivity occurs in response to a detection of a change in operating state of a communication link between the two devices.

9. The method of claim 1, wherein the change in connectivity occurs in response to reception of a data record update, over a communication link, at the first device.

10. The method of claim 1, wherein the data record identifies a time of detection of the change in connectivity.

11. The method of claim 1, wherein the data record contains a matrix of costs for communication links of the rendering network and the spanning tree is calculated from the matrix.

12. The method of claim 1, wherein the data record stores a matrix of communication links within the rendering network and includes for each communication link:
a discovery field representing a time at which the respective communication link is determined to be discovered,
a valid bit field representing a present state of the respective communication link as one of valid or invalid, and
a time field representing a time of most recent update of data for the respective communication link.

13. The method of claim 1, wherein the data record stores a matrix of communication links within the rendering network and includes for each communication link:
a discovery field representing a time at which the respective communication link is determined to be discovered,
a fail field representing a time at which the respective communication link determined to have failed, and
a time field representing a time of most recent update of data for the respective communication link.

14. The method of claim 1, wherein the method is performed in parallel by each device that is a member of the rendering network.

15. The method of claim 1, wherein the update interval is aligned between multiple devices in the rendering network.

16. The method of claim 1, wherein the spanning tree is calculated as set of the communication links that interconnect all devices of the rendering network at a lowest overall cost.

17. Non-transitory computer readable medium storing program instructions that, when executed, cause a processing device to perform a method, comprising:
over an update interval, accumulating one or more network changes at a first device in a rendering network by, upon a change in connectivity between two devices in the rendering network, storing information representing a cost of connectivity in a data record at a first one of the devices,
in response to an end of the update interval in which the one or more network changes were accumulated, calculating a spanning tree from a candidate set of communication links that interconnect devices of the rendering network according to cost information representing communication links of the candidate set, and
exchanging information from the first device to another device of the rendering network according to the spanning tree.

18. The medium of claim 17, wherein the data record is of a conflict-free replicated data type.

19. The medium of claim 17, wherein the change in connectivity occurs in response to a detection that a communication link between the two devices is new.

20. The medium of claim 17, wherein the change in connectivity occurs in response to a detection that a communication link between the two devices is lost.

21. The medium of claim 17, wherein the change in connectivity occurs in response to a detection of a change in operating state of a communication link between the two devices.

22. The medium of claim 17 wherein the change in connectivity occurs in response to reception of a data record update, over a communication link, at the first device.

23. The medium of claim 17, wherein the data record identifies a time of detection of the change in connectivity.

24. The medium of claim 17, wherein the data record contains a matrix of costs for communication links of the rendering network and the spanning tree is calculated from the matrix.

25. The medium of claim 17, wherein the data record stores a matrix of communication links within the rendering network and includes for each communication link:
a discovery field representing a time at which the respective communication link is discovered,
a valid bit field representing a present state of the respective communication link as one of valid or invalid, and
a time field representing a time of most recent update of data for the respective communication link.

26. A processing device comprising:
a memory of a first device in a rendering network to store a data record of a conflict-free replicated data type, the data record containing data representing state information of communication links that interconnect devices within the rendering network, the state information representing communication costs associated with the communication links,
accumulating one or more network changes at the first device over an update interval by storing updates to the data record in the memory, and
in response to an end of the update interval in which the one or more network changes were accumulated, program instructions that, when executed by the processing device, cause the first device to calculate a spanning tree across the communication links according to the communication costs.

27. The device of claim 26, wherein the program instructions further cause the device to exchange data of the rendering network according to a communication link that is a member of the spanning tree.

28. A computer system of a first device in a rendering network, comprising:
  at least one processor;
  at least one memory comprising instructions configured to be executed by the at least one processor to perform a method comprising:
    over an update interval, accumulating one or more network changes by, upon a change in connectivity between the first device and a second device in the rendering network, storing information representing a cost of connectivity in a data record at the device,
    after the update interval in which the one or more network changes were accumulated, calculating a spanning tree from a candidate set of communication links that interconnect devices of the rendering network according to cost information in the data record, and
    exchanging information from the first device to other devices of the rendering network according to the spanning tree.

29. The method of claim 28, wherein the exchanged information includes the cost connectivity.

30. The method of claim 28, wherein the spanning tree carries signaling data that identifies media items to be rendered and timing of such rendering.

31. The method of claim 28, wherein the exchanged information is media data to be rendered.

32. The method of claim 28, wherein the change in connectivity occurs in response to a detection that a communication link between the first device and the second device is new.

33. The method of claim 28, wherein the change in connectivity occurs in response to a detection that a communication link between the first device and the second device is lost.

34. The method of claim 28, wherein the change in connectivity occurs in response to a detection of a change in operating state of a communication link between the first device and the second device.

35. The method of claim 28, wherein the change in connectivity occurs in response to reception of a data record update, over a communication link, at the first device.

36. A method for a first device in a rendering network, comprising:
  accumulating one or more network changes at the first device over an update interval by, upon a change in connectivity among node devices in the rendering network, storing information representing a cost of connectivity in a data record at the first device, the data record storing cost information of available communication link between each pair of node devices;
  in response to an end of the update interval in which the one or more network changes were accumulated, calculating, at the first device, a spanning tree from the cost information in the data record, the spanning tree representing a set of the communication links sufficient to traverse each node device in the rendering network having a lowest overall cost, and
  upon receipt of broadcast information from a transmitting node device of the rendering network, transmitting the broadcast information to next node device(s) in the rendering network according to the communication link(s) identified in the spanning tree.

37. The method of claim 36, wherein the broadcast information is multi-media data.

38. The method of claim 36, further comprising:
  aligning the update interval at the first device with update intervals at other node device(s) in the rendering network.

* * * * *